United States Patent
Bunker (10) Patent No.: US 10,233,775 B2
(45) Date of Patent: Mar. 19, 2019

(54) ENGINE COMPONENT FOR A GAS TURBINE ENGINE

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 655 days.

(21) Appl. No.: 14/881,188

(22) Filed: Oct. 13, 2015

(65) Prior Publication Data

US 2016/0201507 A1    Jul. 14, 2016

Related U.S. Application Data

(60) Provisional application No. 62/073,388, filed on Oct. 31, 2014.

(51) Int. Cl.
| | | |
|---|---|---|
| *F01D 25/12* | (2006.01) | |
| *F01D 9/02* | (2006.01) | |
| *F01D 5/18* | (2006.01) | |

(52) U.S. Cl.
CPC ............ *F01D 25/12* (2013.01); *F01D 5/186* (2013.01); *F01D 9/02* (2013.01); *F05D 2260/202* (2013.01); *Y02T 50/672* (2013.01); *Y02T 50/676* (2013.01)

(58) Field of Classification Search
CPC . F01D 5/186; F01D 9/02; F01D 25/12; F05D 2260/202; Y02T 50/672; Y02T 50/676
See application file for complete search history.

(56) References Cited

U.S. PATENT DOCUMENTS

| | | | |
|---|---|---|---|
| 4,293,275 A | 10/1981 | Kobayashi et al. | |
| 4,416,585 A | 11/1983 | Abdel-Messeh | |
| 4,446,693 A | 5/1984 | Pidcock et al. | |
| 4,474,532 A | 10/1984 | Pazder | |
| 4,515,526 A | 5/1985 | Levengood | |
| 4,669,957 A | 6/1987 | Phillips et al. | |
| 4,738,588 A * | 4/1988 | Field ................ | F01D 5/186 |
| | | | 415/115 |
| 4,775,296 A | 10/1988 | Schwarzmann et al. | |
| 5,062,768 A | 11/1991 | Marriage | |

(Continued)

FOREIGN PATENT DOCUMENTS

| | | |
|---|---|---|
| DE | 19526917 A1 | 1/1997 |
| DE | 102008037384 A1 | 4/2009 |

(Continued)

OTHER PUBLICATIONS

Shawn Michael Pearson et al., filed May 29, 2014, U.S. Appl. No. 62/004,693.
Robert David Briggs et al., filed Oct. 9, 2015, U.S. Appl. No. 14/879,277.
Jason Randolph Allen et al., filed May 14, 2015, U.S. Appl. No. 14/712,287.
Kevin Robert Feldmann et al., filed May 21, 2015, U.S. Appl. No. 14/718,120.

(Continued)

*Primary Examiner* — Igor Kershteyn
(74) *Attorney, Agent, or Firm* — General Electric Company; William Scott Andes (57) ABSTRACT

An engine component for a gas turbine engine includes a film-cooled wall having a hot surface facing hot combustion gas and a cooling surface facing a cooling fluid flow. A film hole in the wall has an inlet, an outlet, and a passage connecting the inlet and outlet that defines an inflection point.

16 Claims, 7 Drawing Sheets

(56) References Cited

U.S. PATENT DOCUMENTS

| | | |
|---|---|---|
| 5,096,379 A | 3/1992 | Stroud et al. |
| 5,288,207 A | 2/1994 | Linask |
| 5,344,283 A | 9/1994 | Magowan et al. |
| 5,361,828 A | 11/1994 | Lee et al. |
| 5,382,133 A | 1/1995 | Moore et al. |
| 5,395,212 A | 3/1995 | Anzai et al. |
| 5,603,606 A | 2/1997 | Glezer et al. |
| 5,611,662 A | 3/1997 | Cunha |
| 5,626,017 A | 5/1997 | Sattelmayer |
| 5,681,144 A | 10/1997 | Spring et al. |
| 5,695,321 A | 12/1997 | Kercher |
| 5,704,763 A | 1/1998 | Lee |
| 5,779,438 A | 7/1998 | Wilfert |
| 5,797,726 A | 8/1998 | Lee |
| 6,000,466 A | 12/1999 | Aoyagi et al. |
| 6,026,892 A | 2/2000 | Kim et al. |
| 6,099,251 A | 8/2000 | Lafleur |
| 6,174,134 B1 | 1/2001 | Lee et al. |
| 6,227,804 B1 | 5/2001 | Koga et al. |
| 6,234,755 B1 | 5/2001 | Bunker et al. |
| 6,241,468 B1 | 6/2001 | Lock et al. |
| 6,254,346 B1 | 7/2001 | Fukuno et al. |
| 6,287,075 B1 | 9/2001 | Kercher |
| 6,290,462 B1 | 9/2001 | Ishiguro et al. |
| 6,331,098 B1 | 12/2001 | Lee |
| 6,368,060 B1 * | 4/2002 | Fehrenbach ............ F01D 5/186 416/97 A |
| 6,383,602 B1 | 5/2002 | Fric et al. |
| 6,406,260 B1 | 6/2002 | Trindade et al. |
| 6,416,283 B1 | 7/2002 | Johnson et al. |
| 6,547,524 B2 | 4/2003 | Kohli et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker et al. |
| 6,722,134 B2 | 4/2004 | Bunker |
| 6,868,060 B2 | 3/2005 | Barzegar et al. |
| 6,890,154 B2 | 5/2005 | Cunha |
| 6,896,509 B2 | 5/2005 | Carroni et al. |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,104,757 B2 | 9/2006 | Gross |
| 7,128,533 B2 | 10/2006 | Liang |
| 7,137,781 B2 | 11/2006 | Harvey et al. |
| 7,186,084 B2 | 3/2007 | Bunker et al. |
| 7,195,458 B2 | 3/2007 | Liang |
| 7,246,992 B2 * | 7/2007 | Lee ............ B23H 9/10 415/115 |
| 7,300,242 B2 | 11/2007 | Liang |
| 7,399,160 B2 | 7/2008 | Harvey et al. |
| 7,413,407 B2 | 8/2008 | Liang |
| 7,445,432 B2 | 11/2008 | Levine et al. |
| 7,520,723 B2 | 4/2009 | Liang |
| 7,534,089 B2 | 5/2009 | Liang |
| 7,547,191 B2 | 6/2009 | Liang |
| 7,553,534 B2 | 6/2009 | Bunker |
| 7,637,720 B1 | 12/2009 | Liang |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,806,658 B2 | 10/2010 | Liang et al. |
| 7,824,156 B2 | 11/2010 | Dellmann et al. |
| 7,866,948 B1 | 1/2011 | Liang |
| 7,938,624 B2 | 5/2011 | Tibbott |
| 7,985,050 B1 | 7/2011 | Liang |
| 8,052,390 B1 | 11/2011 | Liang |
| 8,057,181 B1 * | 11/2011 | Liang ............ F01D 5/186 416/97 R |
| 8,066,484 B1 | 11/2011 | Liang |
| 8,186,942 B2 | 5/2012 | Haas |
| 8,245,519 B1 * | 8/2012 | Liang ............ F01D 5/186 415/115 |
| 8,297,926 B2 | 10/2012 | Grobeta |
| 8,408,872 B2 | 4/2013 | Briggs et al. |
| 8,672,613 B2 | 3/2014 | Bunker |
| 8,915,713 B2 * | 12/2014 | Boyer ............ F01D 5/186 29/889.72 |
| 2005/0042074 A1 | 2/2005 | Liang |
| 2005/0084371 A1 | 4/2005 | Fried et al. |
| 2006/0073011 A1 | 4/2006 | Lee et al. |
| 2006/0099073 A1 | 5/2006 | Djeridane et al. |
| 2007/0128029 A1 | 6/2007 | Liang et al. |
| 2007/0297916 A1 | 12/2007 | Levine et al. |
| 2007/0297917 A1 | 12/2007 | Levine et al. |
| 2008/0164013 A1 | 7/2008 | Maziers |
| 2008/0267784 A1 | 10/2008 | Bolms et al. |
| 2009/0087312 A1 | 4/2009 | Bunker et al. |
| 2009/0145581 A1 | 6/2009 | Hoffman et al. |
| 2010/0040480 A1 | 2/2010 | Webster et al. |
| 2010/0221121 A1 | 9/2010 | Liang |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0038709 A1 | 2/2011 | Liang et al. |
| 2011/0164960 A1 | 7/2011 | Maldonado |
| 2012/0070306 A1 | 3/2012 | Lee et al. |
| 2012/0324897 A1 | 12/2012 | McMahan et al. |
| 2013/0039777 A1 * | 2/2013 | Piggush ............ F01D 5/186 416/97 R |
| 2013/0043009 A1 * | 2/2013 | Bunker ............ F01D 5/187 165/104.34 |
| 2013/0089434 A1 | 4/2013 | Simpson et al. |
| 2013/0205787 A1 * | 8/2013 | Zelesky ............ F01D 5/186 60/722 |
| 2013/0205790 A1 | 8/2013 | Xu et al. |
| 2013/0209228 A1 | 8/2013 | Xu |
| 2013/0209229 A1 | 8/2013 | Xu et al. |
| 2014/0219814 A1 | 8/2014 | Heselhaus |
| 2014/0321980 A1 * | 10/2014 | Lee ............ F01D 5/187 415/115 |

FOREIGN PATENT DOCUMENTS

| | | |
|---|---|---|
| EP | 0845580 A2 | 6/1998 |
| EP | 1118747 A2 | 7/2001 |
| EP | 1655453 A1 | 5/2006 |
| EP | 1882818 A1 | 1/2008 |
| EP | 1921268 A1 | 5/2008 |
| EP | 1975372 A1 | 10/2008 |
| EP | 2107215 A1 | 10/2009 |
| GB | 2262314 A | 6/1993 |
| GB | 2358226 A | 7/2001 |
| JP | 08505921 A | 6/1996 |
| JP | 08338202 A | 12/1996 |
| JP | 3040590 B2 | 5/2000 |
| JP | 3124109 B2 | 1/2001 |
| JP | 3182602 B2 | 7/2001 |
| JP | 3586637 B2 | 11/2004 |
| JP | 2006105141 A | 4/2006 |
| JP | 2008506061 A | 2/2008 |
| WO | 2014055259 A1 | 4/2014 |

OTHER PUBLICATIONS

Ronald Scott Bunker et al., filed May 29, 2014, U.S. Appl. No. 62/004,682.
Ronald Scott Bunker, filed May 29, 2014, U.S. Appl. No. 62/004,689.
Ronald Scott Bunker, filed May 29, 2014, U.S. Appl. No. 62/004,677.
Scott Bunker et al., filed Oct. 14, 2015, U.S. Appl. No. 14/881,551.
Ronald Scott Bunker, filed Oct. 31, 2014, U.S. Appl. No. 62/073,455.
Ronald Scott Bunker et al., filed Oct. 31, 2014, U.S. Appl. No. 62/073,429.
PCT Search Report and Written Opinion issued in connection with related PCT Application No. PCT/US2015/033240 dated Oct. 8, 2015.

(56) References Cited

OTHER PUBLICATIONS

European Search Report and Opinion issued in connection with related EP Application No. 15168677.1 dated Nov. 2, 2015.
European Search Report and Opinion issued in connection with corresponding EP Application No. 15192372.9 dated Mar. 4, 2016.
European Search Report and Opinion issued in connection with related EP Application No. 15192458.6 dated Mar. 8, 2016.
Great Britain Search Report and Opinion issued in connection with related GB Application No. 1015936.6 dated Jan. 14, 2011.
U.S. Non-Final Office Action issued in connection with Related U.S. Appl. No. 12/618,241 dated Aug. 10, 2012.
Unofficial English Translation of Japanese Office Action issued in connection with related JP Application No. 2010208729 dated Jun. 3, 2014.
Unofficial English Translation of Japanese Notice of Allowance issued in connection with related JP Application No. 2010208729 dated Jul. 22, 2014.
Great Britain Office Action issued in connection with related GB Application No. 1015936.6 dated May 28, 2015.
Great Britain Office Action issued in connection with related GB Application No. 1015936.6 dated Aug. 11, 2015.
Canadian Office Action issued in connection with Related CA Application No. 2714543 dated Jun. 29, 2016.
PCT Search Report and Written Opinion issued in connection with Related PCT Application No. PCT/US2015/057718 dated Jun. 16, 2016.

\* cited by examiner

ENGINE COMPONENT FOR A GAS TURBINE ENGINE

CROSS-REFERENCE TO RELATED APPLICATION

This non-provisional application claims the benefit of priority under 35 U.S.C. § 119(e) to U.S. Provisional Patent Application No. 62/073,539, entitled "SHROUD ASSEMBLY FOR A TURBINE ENGINE", filed Oct. 31, 2014, which is herein incorporated in its entirety by reference.

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is around 500° C. to 700° C. While the compressor air is a high temperature, it is cooler relative to the turbine air, and may be used to cool the turbine.

Particles, such as dirt, dust, sand, and other environmental contaminants, in the cooling air can cause a loss of cooling and reduced operational time or "time-on-wing" for the aircraft environment. For example, particles supplied to the turbine components can clog, obstruct, or coat the flow passages and surfaces of the components, which can reduce the lifespan of the turbine. In particular, particles can coat and block the film holes present in components. This problem is exacerbated in certain operating environments around the globe where turbine engines are exposed to significant amounts of airborne particles.

BRIEF DESCRIPTION OF THE INVENTION

In one aspect, the invention relates to an engine component for a gas turbine engine generating hot combustion gas. The engine component includes a wall separating the hot combustion gas from a cooling fluid flow and having a hot surface facing the hot combustion gas and a cooling surface facing the cooling fluid flow, and a film hole having an inlet provided on the cooling surface, an outlet provided on the hot surface, and a passage connecting the inlet and the outlet. The passage is formed by a wall having at least one localized curvilinear portion transitioning between concave and convex to define an inflection point.

DESCRIPTION OF EMBODIMENTS OF THE INVENTION

The described embodiments of the present invention are directed to a film-cooled engine component, particularly in a gas turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
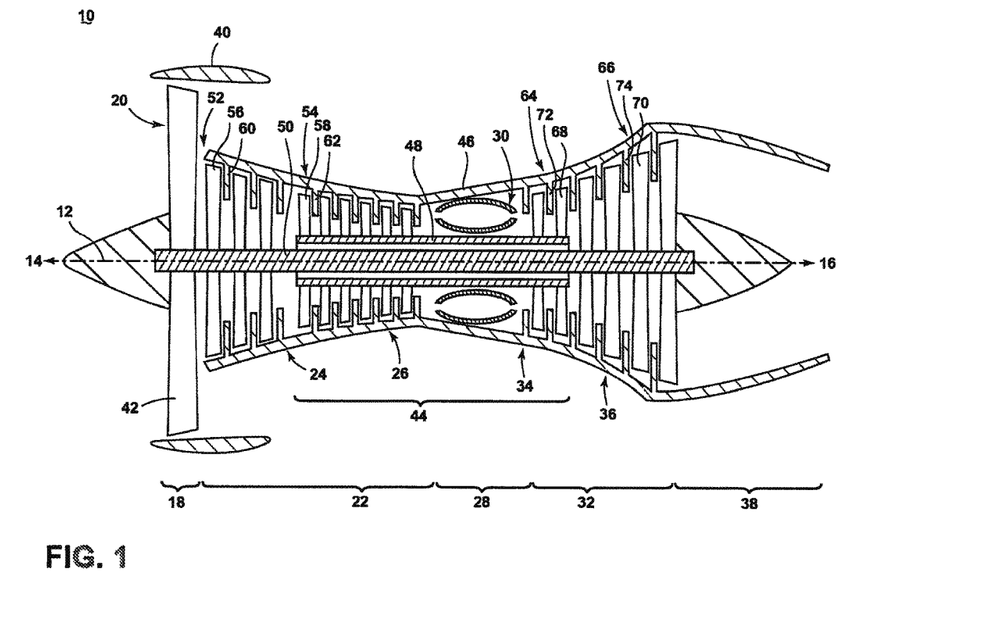
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
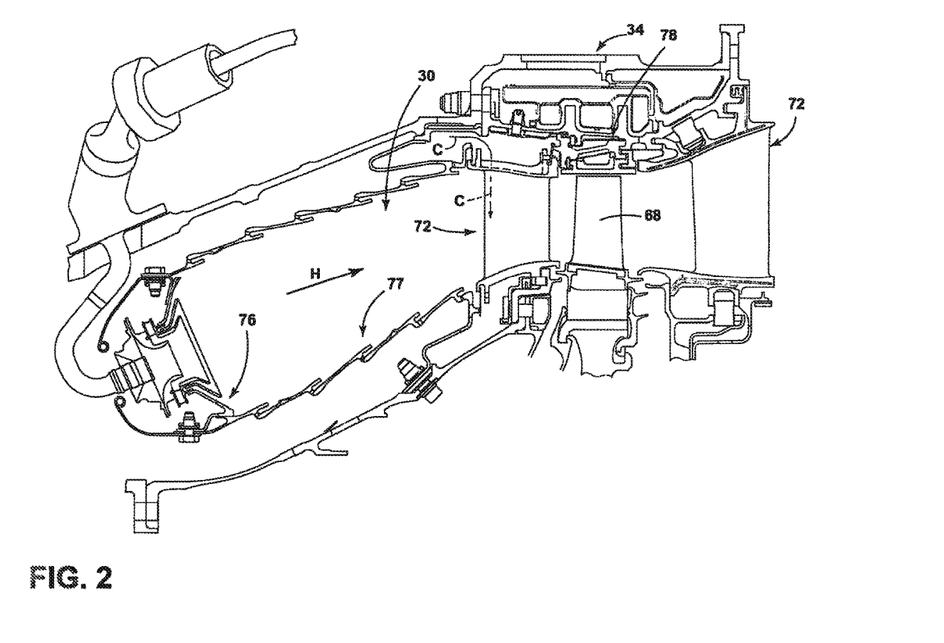
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of static turbine vanes 72, with adjacent vanes 72 forming nozzles therebetween. The nozzles turn combustion gas so that the maximum energy may be extracted by the turbine 34. A cooling fluid flow C passes through the vanes 72 to cool the vanes 72 as hot combustion gas H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 has a film-cooled wall in which various film hole embodiments disclosed further herein may be utilized. Some non-limiting examples of the engine component having a film-cooled wall can include the blades 68, 70, vanes or nozzles 72, 74, combustor deflector 76, combustor liner 77, or shroud assembly 78, described in FIGS. 1-2. Other non-limiting examples where film cooling is used include turbine transition ducts and exhaust nozzles.

Figure 3:
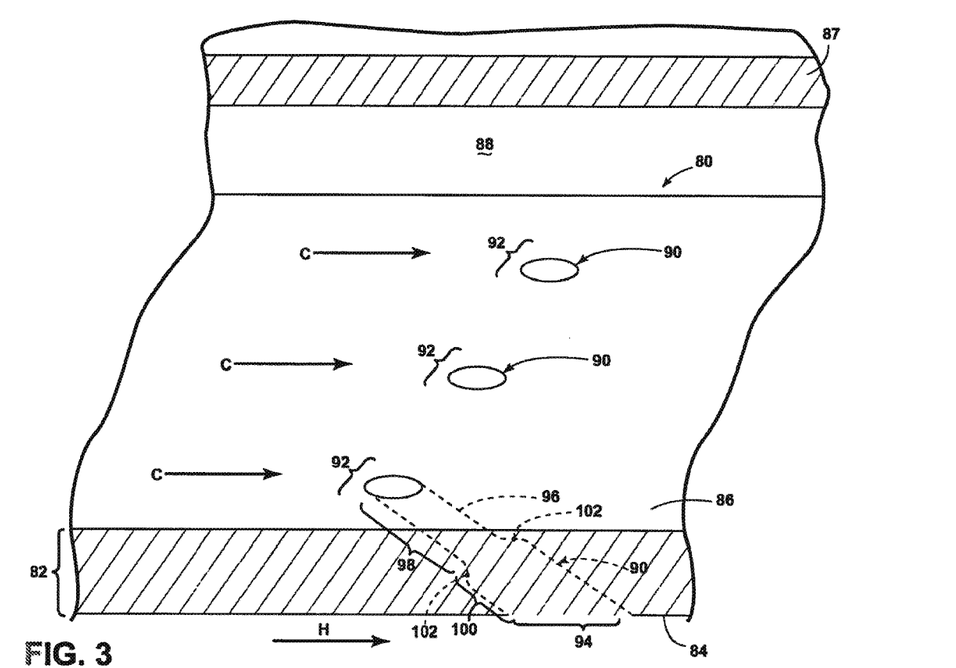
FIG. 3 is a perspective view of a portion of an engine component having a film-cooled wall in accordance with a first embodiment of the invention.

FIG. 3 is a schematic view showing a portion of an engine component 80 of the engine 10 from FIG. 1 according to a first embodiment of the invention. The engine component 80 can be disposed in a flow of hot gases represented by arrows H. A cooling fluid flow, represented by arrows C may be supplied to cool the engine component. As discussed above with respect to FIGS. 1-2, in the context of a turbine engine, the cooling air can be ambient air supplied by the fan 20 which bypasses the engine core 44, fluid discharged from the LP compressor 24, or fluid discharged from the HP compressor 26.

The engine component 80 includes at least one wall 82 having a hot surface 84 facing the hot combustion gas and a cooling surface 86 facing cooling fluid. In the case of a gas turbine engine, the hot surface 84 may be exposed to gases having temperatures in the range of 1000° C. to 2000° C. Suitable materials for the wall 82 include, but are not limited to, steel, refractory metals such as titanium, or super alloys based on nickel, cobalt, or iron, and ceramic matrix composites.

In the illustrated embodiment, a second wall 87 of the engine component 80 is shown, which, together with the first wall 82, defines at least one interior cavity 88, which comprises the cooling surface 86. The hot surface 84 may be an exterior surface of the engine component 80.

The engine component 80 further includes multiple film holes 90 that provide fluid communication between the interior cavity 88 and the hot surface 84 of the engine component 80. During operation, cooling air C is supplied to the interior cavity 88 and out of the film holes 90 to create a thin layer or film of cool air on the hot surface 84, protecting it from the hot combustion gas H. It is noted that although the wall 82 of the engine component 80 is shown as being planar, it is understood that the film hole 90 may be applied to a curved wall of an engine component 80 as well.

Each film hole 90 can have an inlet 92 provided on the cooling surface 86 of the wall 82, an outlet 94 provided on the hot surface 84, and a passage 96 connecting the inlet 92 and outlet 94. The passage 96 can define a metering section 98 for metering of the mass flow rate of the cooling fluid C and a diffusing section 100 in which the cooling fluid C may expand to form a wider cooling film. The metering section 98 can be a portion of the passage 96 with the smallest cross-sectional area, and may be a discrete location or an elongated section of the passage 96. The metering section 98 can be provided at or near the inlet, while the diffusion section 100 can be defined at or near the outlet. Cooling fluid C enters the film hole 90 through the inlet 92 and passes through the metering section 98 and diffusing section 100 before exiting the film hole 90 at the outlet 94 along the hot surface 84.

The present invention provides for a shaping or contouring of the film hole 90 by providing the passage 96 with at least one inflection point 102 between the inlet 92 and outlet 94. Such contouring may be beneficial for one or more desirable purposes related to film effectiveness, in-hole shock mitigation, or particle accumulation prevention.

Figure 4:
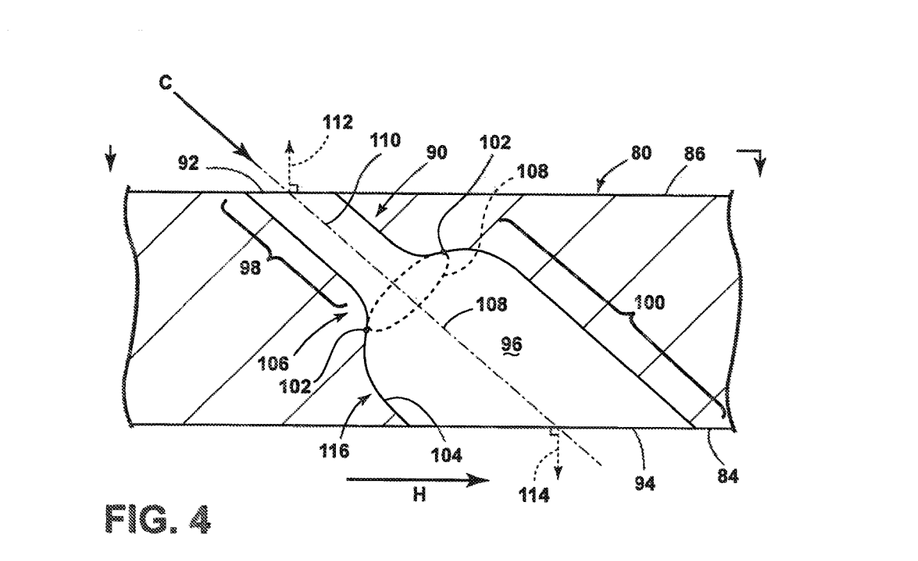
FIG. 4 is a sectional view through a film hole of the engine component from FIG. 3.
Figure 5:
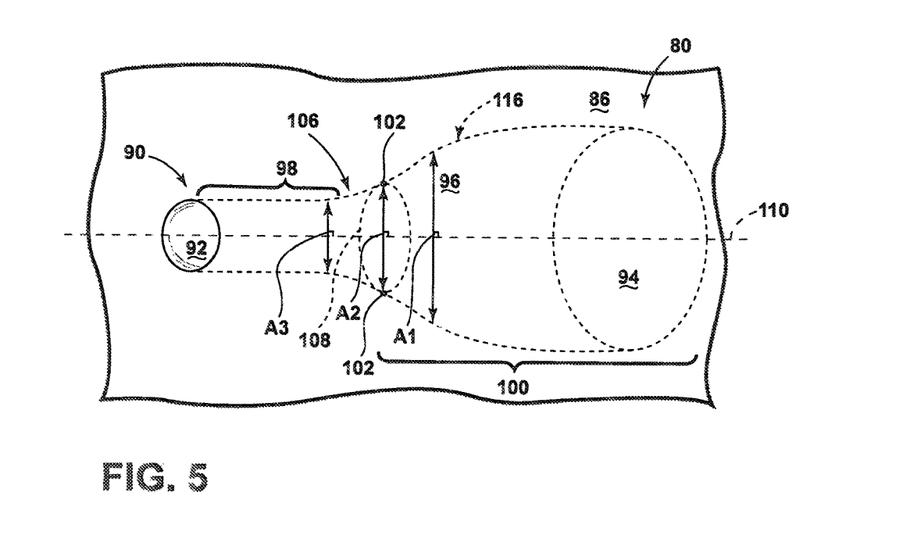
FIG. 5 is a plan view of a cooling surface of the engine component from FIG. 3.

FIG. 4 is a sectional view through one of the film holes 90 of the engine component 80. The passage 96 is formed by an interior wall 104 having at least a localized curvilinear portion 106 transitioning between concave and convex to define the at least one inflection point 102. The transition from concave to convex can occur in the flow direction, i.e. from the inlet 92 to the outlet 94, or against the flow direction, i.e. from the outlet 94 to the inlet 92. Other portions of the passage 96 may be virtually any shape, including linear, piece-wise linear, or curvilinear.

The at least one inflection point 102 can lie along an inflection transition line 108 that extends partially or fully about the circumference of the passage 96. The inflection transition line 108 is an imaginary line at which the localized curvilinear portion 106 of the passage 96 transitions between a concave surface and a convex surface. In the illustrated embodiment, the inflection transition line 108 extends fully about the circumference of the passage 96, such that an inflection point 102 is provided on both the upstream or downstream portion of the passage 96, defined with respect to the direction of the cooling fluid flow C.

The film hole 90 extends along a centerline 110 defined by the passage 96. The centerline 110 of the passage 96 is a line through the geometric centers of two-dimensional regions of the passage 96 perpendicular to the general direction of the cooling fluid flow C. Due to the presence of at least one inflection point 102 in the passage 96, the centerline 110 may take on various profiles, including linear and curvilinear. In the illustrated embodiment, the centerline 110 is linear and inclined, such that it is non-orthogonal to a local normal 112, 114 for either or both of the cooling surface 86 and the hot surface 84. The local normal 112 for the cooling surface 86 is a line extending perpendicularly from the cooling surface 86 at the intersection of the centerline 110 with the cooling surface 86. The local normal 114 for the hot surface 84 is a line extending perpendicularly from the hot surface 84 at the intersection of the centerline 110 with the hot surface 84.

It is noted that a streamline of the cooling fluid flow C, indicated by the arrow in FIG. 4, may be generally collinear with the centerline 110 of the film hole 90 in areas where the passage 96 is circular or otherwise symmetrical. In areas where the passage 96 is irregular or asymmetrical, the streamline may diverge from the centerline 110.

Due to the at least one inflection point 102, the cross-sectional area of the film hole 90, defined with respect to a plane perpendicular to the centerline 110, may change at least once between the inlet 92 and outlet 94. As a result, the cross-sectional area of the passage 96 at the inlet 92 may be the same as or different than the area of the passage 96 at the outlet 94. Alternatively, the cross-sectional area of the film hole 90 may remain constant between the inlet 92 and outlet 94.

In the illustrated embodiment, the inflection point 102 on the upstream side defines a transition from concave to convex, while the inflection point 102 on the downstream side defines a transition from convex to concave. Due to this arrangement, the cross-sectional area A1 immediately downstream of the inflection transition line 108 is greater than the cross-sectional area A2 at the inflection transition line 108. Further, the cross-sectional area A3 immediately upstream of the inflection transition line 108 is less than the cross-sectional area A2 at the inflection transition line 108.

In the illustrated embodiment, the curvilinear portion 106 further divides the metering and diffusion sections 98, 100 of the passage 96. The larger cross-sectional area A1 downstream of the inflection transition line 108 forms a flared portion 116 of the outlet 94, which flares inwardly from the hot surface 84. As used herein, the term "flared" and variations thereof, is defined as gradually becoming wider at one end. Here, the flared portion 116 is wider at the hot surface 84 and narrows gradually in the upstream direction of the passage 96 to define the diffusing section 100 of the film hole 90.

FIGS. 6-10 show some alternative geometries for the film holes 90 of the engine component 80. The film holes 90 are substantially similar to the film holes 90 described for the first embodiment, and like elements are referred to with the same reference numerals. It will be readily understood by a person skilled in the art that only a few examples are shown herein, and that many more examples of film holes with at least one internal infection point are possible.

Figure 6:
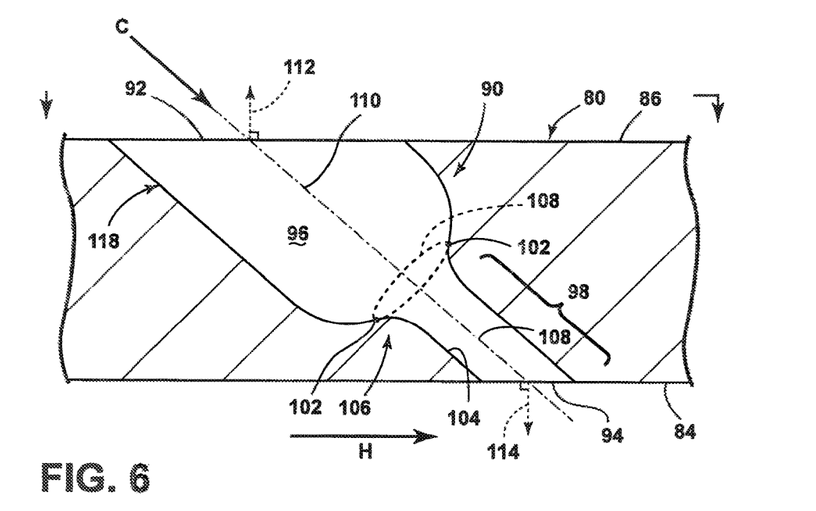
FIG. 6 is a sectional view of an engine component having a film-cooled wall in accordance with a second embodiment of the invention.
Figure 7:
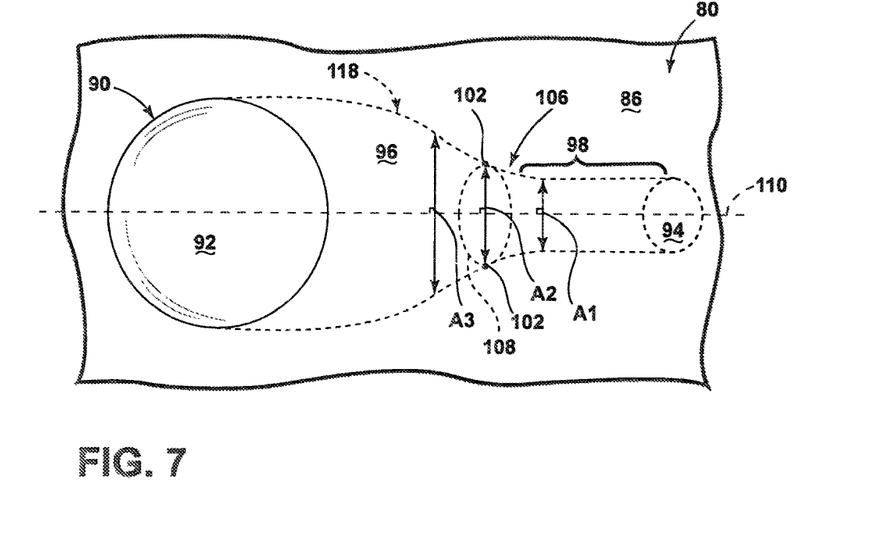
FIG. 7 is a plan view of a cooling surface of the engine component from FIG. 6.

FIGS. 6-7 are sectional and plan views of an engine component 80 having a film hole 90 in accordance with a second embodiment of the invention. The film hole 90 of the second embodiment differs from the first embodiment in that the metering section 98 is provided downstream of the inflection transition line 108, with the cross-sectional area A1 immediately downstream of the inflection transition line 108 being less than the cross-sectional area A2 at the inflection transition line 108. Further, the cross-sectional area A3 immediately upstream of the inflection transition line 108 is greater than the cross-sectional area A2 at the inflection transition line 108. The larger cross-sectional area A1 upstream of the inflection transition line 108 forms a flared portion 118 of the inlet 92, which flares inwardly from the cooling surface 86. Here, the flared portion 118 is wider at the cooling surface 86 and narrows gradually in the downstream direction of the passage 96.

Figure 8:
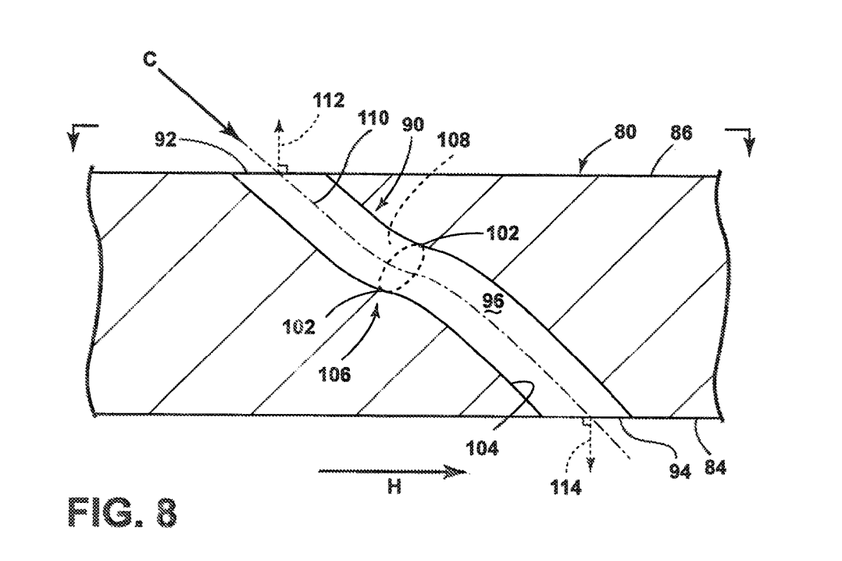
FIG. 8 is a sectional view of an engine component having a film-cooled wall in accordance with a third embodiment of the invention.
Figure 9:
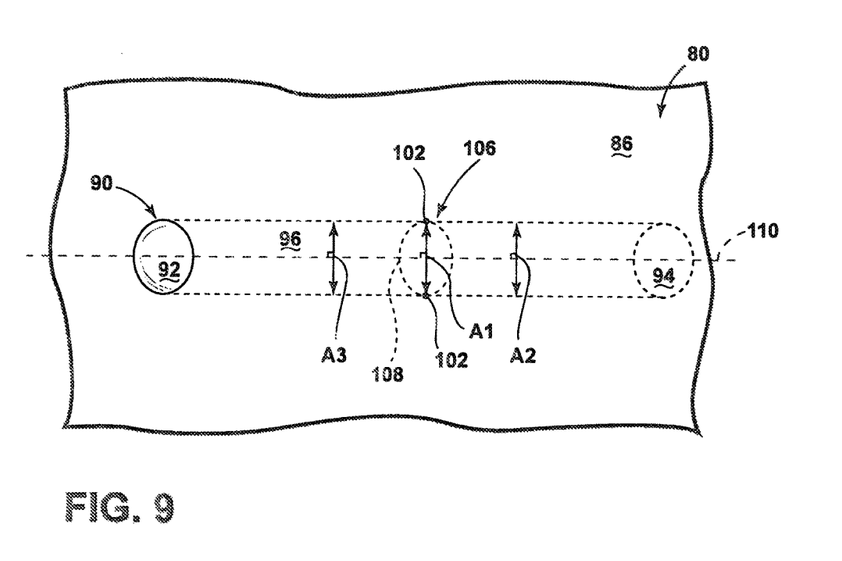
FIG. 9 is a plan view of a cooling surface of the engine component from FIG. 8.

FIGS. 8-9 are sectional and plan views of an engine component 80 having a film hole 90 in accordance with a third embodiment of the invention. The film hole 90 of the third embodiment differs from the first embodiment in that the inflection points 102 on the upstream and downstream sides of the passage 96, with respect to the direction of the cooling fluid flow C, both define a transition from convex to concave, and the centerline 110 is curvilinear. Furthermore, the passage 96 has a substantially constant cross-sectional area from the inlet 92 to the outlet 94.

Figure 10:
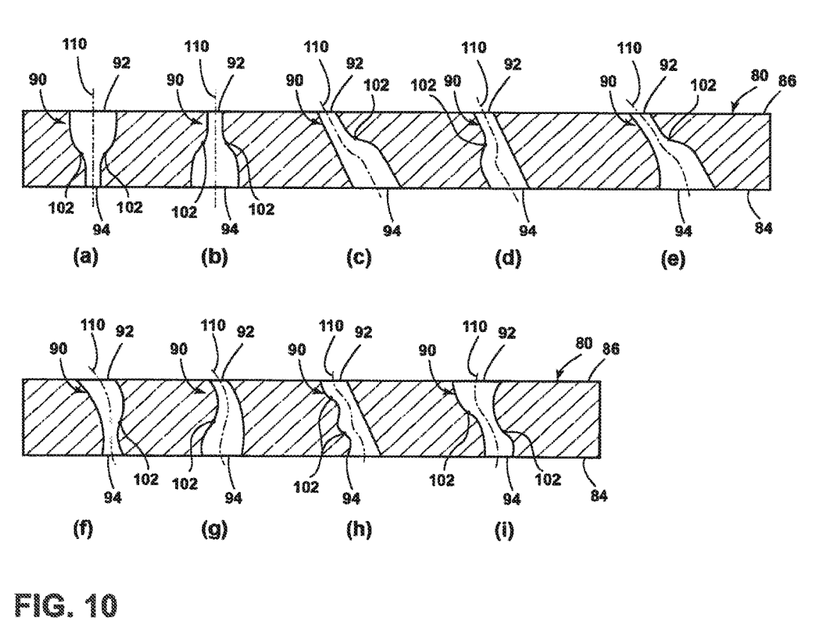
FIG. 10 is a sectional view of an engine component having a film-cooled wall with various film hole geometries in accordance with further embodiment of the invention.

FIG. 10 is a sectional view of an engine component 80 with various film hole geometries in accordance with further embodiment of the invention. From the foregoing, many of the distinguishing features of the film holes 90 will be readily apparent, and only a few of the more salient features are described herein. For example, for (a) and (b), the centerline 110 of the film hole 90 is linear and normal to the cooling surface 86 and the hot surface 84. Further, in (a) the inlet 92 is flared, while in (b) the outlet 94 is flared). In (c), the upstream side of the film hole 90 is linear, while the downstream side possesses the inflection point. In (d), the upstream side of the film hole 90 possesses the inflection point 102, while the downstream side is linear. In (e), the upstream side of the film hole 90 is curved, while the downstream side possesses the inflection point 102, and the outlet 94 is flared. In (f), the upstream side of the film hole 90 is curved, while the downstream side possesses the inflection point 102, and the inlet 92 is flared. In (g), the upstream side of the film hole 90 possesses the inflection point 102, while the downstream side is curved. In (h), the upstream side of the film hole 90 possesses multiple inflection points 102, while the downstream side is linear. In (i), both the upstream and sides of the film hole 90 possesses an inflection point 102, with the inflection point 102 on the downstream side of the film hole 90 being downstream of the inflection point 102 on the upstream side.

Furthermore, in any of the above embodiments, a protective coating, such as a thermal barrier coating or multi-layer coating system, can be applied to the hot surface 84 of the engine component 80. Also, the present invention may be combined with shaping or contouring of the inlet or outlet of the film holes 90. The present invention may also apply to slot-type film cooling, in which case the outlets 94 are provided within a slot on the hot surface 84.

The various embodiments of systems, methods, and other devices related to the invention disclosed herein provide improved cooling for engine structures, particularly in an engine component having film holes. One advantage that may be realized in the practice of some embodiments of the described systems is that the film hole can be shaped to include at least one inflection point for beneficial performance, whether that be for film effectiveness, in-hole shock mitigation, or particle accumulation prevention. Conventional film hole design utilizes a passage with a circular inlet region, a metering section, and a shaped outlet region to help diffuse the cooling fluid. By shaping the film hole to include at least one inflection point, improved cooling performance and mitigation of particle buildup in the engine component is achievable, which can lead to longer service life of the engine component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine, the gas turbine engine generating hot combustion gas, comprising:
    a wall separating the hot combustion gas from a cooling fluid flow and having a hot surface facing the hot combustion gas and a cooling surface facing the cooling fluid flow; and
    a film hole having an inlet provided on the cooling surface, an outlet provided on the hot surface, and a passage connecting the inlet and the outlet;
    wherein the passage is formed by a wall having at least one localized curvilinear portion transitioning between concave and convex to define an inflection point;
    wherein the cross-sectional area immediately upstream of the inflection point is greater than, and the cross-sectional area immediately downstream of the inflection point is less than, the cross-sectional area at the inflection point.

2. The engine component of claim 1 wherein the cross-sectional area of the passage from the inlet to the inflection point is constant.

3. An engine component for a gas turbine engine, the gas turbine engine generating hot combustion gas, comprising:
    a wall separating the hot combustion gas from a cooling fluid flow and having a hot surface facing the hot combustion gas and a cooling surface facing the cooling fluid flow; and
    a film hole having an inlet provided on the cooling surface, an outlet provided on the hot surface, and a passage connecting the inlet and the outlet;
    wherein the passage is formed by a wall having at least one localized curvilinear portion transitioning between concave and convex to define an inflection point;
    wherein the cross-sectional area of the passage from the inflection point to the outlet is constant.

4. The engine component of claim 3 wherein the cross-sectional area of the passage from the inlet to the inflection point is constant.

5. An engine component for a gas turbine engine, the gas turbine engine generating hot combustion gas, comprising:
    a wall separating the hot combustion gas from a cooling fluid flow and having a hot surface facing the hot combustion gas and a cooling surface facing the cooling fluid flow; and
    a film hole having an inlet provided on the cooling surface, an outlet provided on the hot surface, and a passage connecting the inlet and the outlet;
    wherein the passage is formed by a wall having at least one localized curvilinear portion transitioning between concave and convex to define an inflection point;
    wherein the inflection point lies along an inflection transition line that extends at least partially about the circumference of the passage, wherein the inflection transition line is an imaginary line at which the localized curvilinear portion of the passage transitions between a concave surface and a convex surface.

6. The engine component of claim 5 wherein the inflection transition line extends completely about the circumference of the passage.

7. The engine component of claim 5 wherein the passage defines a centerline formed by a line passing through the center of the cross-sectional area for each point along the passage, wherein the centerline is linear.

8. The engine component of claim 5 wherein the passage defines a centerline formed by a line passing through the center of the cross-sectional area for each point along the passage, wherein the centerline is curvilinear.

9. An engine component for a gas turbine engine, the gas turbine engine generating hot combustion gas, comprising:
- a wall separating the hot combustion gas from a cooling fluid flow and having a hot surface facing the hot combustion gas and a cooling surface facing the cooling fluid flow; and
- a film hole having an inlet provided on the cooling surface, an outlet provided on the hot surface, and a passage connecting the inlet and the outlet;
- wherein the passage is formed by a wall having at least one localized curvilinear portion transitioning between concave and convex to define an inflection point;
- wherein the inlet comprises a flared portion flaring inwardly from the cooling surface.

10. The engine component of claim 9 wherein the flared portion has a smaller cross-sectional area inwardly from the cooling surface than the cross-sectional area at the cooling surface.

11. The engine component of claim 9 wherein the outlet comprises a flared portion flaring inwardly from the hot surface.

12. The engine component of claim 11 wherein the flared portion has a smaller cross-sectional area inwardly from the hot surface than the cross-sectional area at the hot surface.

13. The engine component of claim 11 wherein the flared portion defines a diffusing section of the film hole.

14. The engine component of claim 9 wherein at least one of the inlet, the outlet or the passage define a metering section.

15. The engine component of claim 14 wherein the passage defines the metering section.

16. The engine component of claim 15 wherein the metering section is adjacent the at least one localized curvilinear portion.

* * * * *